United States Patent
Eskandry

[19]

[11] Patent Number: 6,012,575

[45] Date of Patent: *Jan. 11, 2000

[54] COMPACT DISK CASE WITH STACKABLE SLEEVES

[76] Inventor: Ezra D. Eskandry, 1925 Brickell Ave., D901, Miami, Fla. 33129

[*] Notice: This patent is subject to a terminal disclaimer.

[21] Appl. No.: 09/170,442

[22] Filed: Oct. 13, 1998

Related U.S. Application Data

[63] Continuation-in-part of application No. 08/904,399, Jul. 31, 1997, Pat. No. 5,826,717.

[51] Int. Cl.[7] .............................. B65D 85/57; B60R 7/00
[52] U.S. Cl. ..................... 206/308.1; 206/311; 206/425; 229/312; 229/572
[58] Field of Search ............................... 206/308.1, 309, 206/311, 425; 40/79, 80 P; 229/312, 572

[56] References Cited

U.S. PATENT DOCUMENTS

| | | | |
|---|---|---|---|
| 903,232 | 11/1908 | Rosenthal | 206/311 |
| 1,186,312 | 6/1916 | Hanselman | 206/311 |
| 1,275,259 | 8/1918 | Hooker | 206/311 |
| 1,424,778 | 8/1922 | Sea | 206/311 |
| 2,287,365 | 6/1942 | Widder et al. | 206/311 |
| 2,327,324 | 8/1943 | Weinger | 206/311 |
| 2,721,556 | 10/1955 | Zandelin | 206/311 |
| 4,778,047 | 10/1988 | Lay | 206/311 X |
| 4,838,709 | 6/1989 | Guerriero et al. | 206/308.3 X |
| 4,844,311 | 7/1989 | Kalen | 224/312 |
| 5,555,977 | 9/1996 | Oshry et al. | 206/308.1 |
| 5,715,937 | 2/1998 | Oshry et al. | 206/308.1 |
| 5,762,246 | 6/1998 | Drew | 274/312 |
| 5,826,717 | 10/1998 | Eskandry | 206/308.1 |

FOREIGN PATENT DOCUMENTS

| | | | |
|---|---|---|---|
| 1194784 | 11/1959 | France | 206/311 |
| 121579 | 10/1926 | Germany | 206/311 |

*Primary Examiner*—Byron P. Gehman
*Attorney, Agent, or Firm*—Robert C. Kain, Jr.

[57] ABSTRACT

The compact disk carrying case includes, in one embodiment, an outer enclosure which is defined by two clam-shell members. Each clam-shell member has an interfacing edge which mates with the corresponding interfacing edge on the other clam-shell member. A mechanism is provided, such as a zipper, for closing the interfacing edges thereby forming a closeable outer enclosure within which is captured a plurality of compact disks. The clam-shell members are hinged together along a portion of each respective interfacing edge. The carrying case includes a plurality of compact disk carrying plates which are grouped together into n end pairs of plates by n hinges. Each hinge has a progressively increasing span distance between the respective connected plates. Accordingly, these hinges establish minimum, a plurality of intermediate and a maximum span distance between the respective connected plates. In use, the maximum span CD carrying plate hinge is disposed proximate the clam-shell member hinge, the plurality of intermediate span plate hinges are disposed progressively next to the maximum span plate hinge and the minimum span plate hinge is disposed in an interior region of the compact disk carrying case such that it is adapted to be closed on itself such that its respective connected plates are proximately facing each other when the CD carrying case is closed.

32 Claims, 3 Drawing Sheets

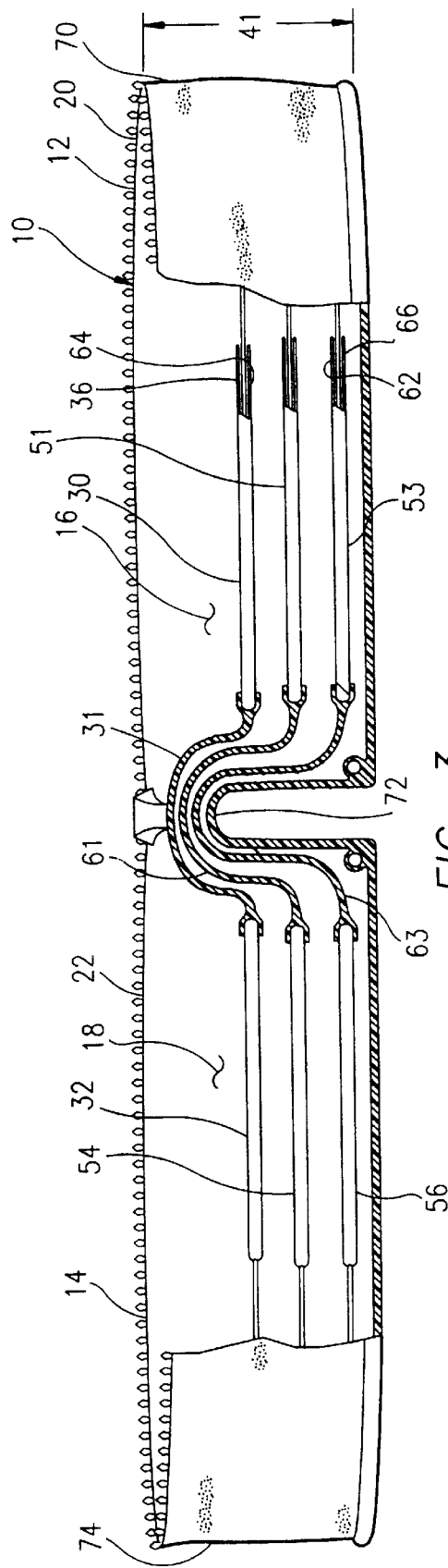
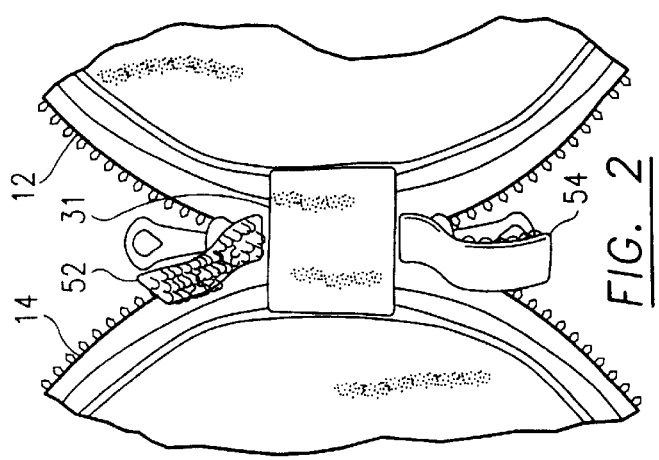
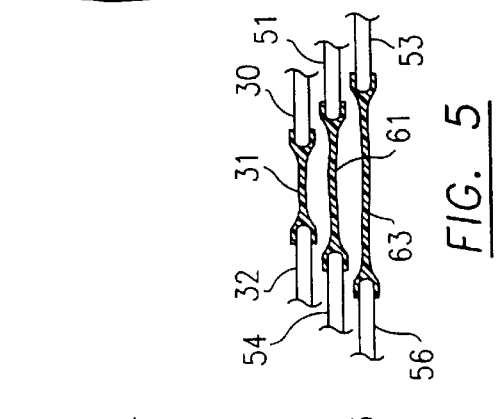
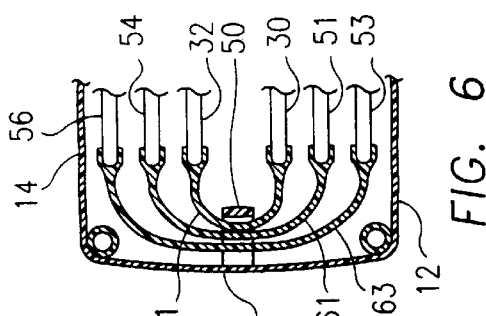
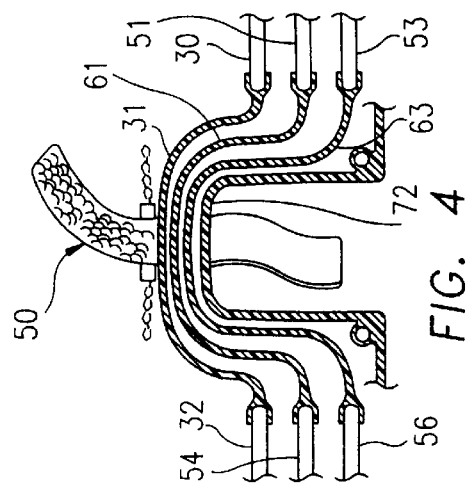

COMPACT DISK CASE WITH STACKABLE SLEEVES

This is a continuation in part of patent application Ser. No. 08/904,399 filed Jul. 31, 1997, now U.S. Pat. No. 5,826,717.

The present invention relates to a compact disk case with stackable sleeves carried in a clam-shell configured outer enclosure.

BACKGROUND OF THE INVENTION

Compact disks or CDs carry audio and computer data. These disks are generally circular, about 4–6 inches in diameter and are very thin plates or platters. Commonly, CDs are made of a plastic type material. Although many CDs are sold in rectangular flat boxes, these boxes are difficult to transport. Accordingly, various types of carrying cases have been developed to hold the circular CD platters.

Some of these CD carrying cases utilize a generally circular plate made of cardboard or other semi-rigid material which is covered by felt or other type of smooth fiber cloth. Commonly, the CDs are inserted into pockets which are formed between the circular plate (covered by the cloth) and a semi circular piece of cloth sewn to a portion of the plate.

OBJECTS OF THE INVENTION

It is an object of the present invention to provide a compact disk carrying case with stackable sleeves.

It is another object of the present invention to provide a carrying case formed by two clam-shell members which close upon each other and capture pairs of disk carrying plates in its interior.

It is another object of the present invention to group these disk carrying plates into pairs wherein each pair is attached by a hinge and each hinge has a progressively increasing span distance between the respective, connected plates.

It is an additional object of the present invention to dispose the pair of disk carrying plates having a maximum span plate hinge near the clam-shell member hinge, to dispose intermediate span plate hinges atop the maximum span hinge and to dispose a minimum span plate hinge in a central location such that the hinge is adapted to be closed on itself such that its respective connected plates are proximately facing each other when both clam-shell members are closed thereby defining a closed compact disk case.

SUMMARY OF THE INVENTION

The compact disk carrying case includes, in one embodiment, an outer enclosure which is defined by two clam-shell members. Each clam-shell member has an interfacing edge which mates with the corresponding interfacing edge on the other clam-shell member. A mechanism is provided, such as a zipper, for closing the interfacing edges thereby forming a closeable outer enclosure within which is captured a plurality of compact disks. The clam-shell members are hinged together along a portion of each respective interfacing edge. The carrying case includes a plurality of compact disk carrying plates which are grouped together into n pairs of plates by n hinges. Each hinge has a progressively increasing span distance between the respective connected plates. Accordingly, these hinges establish minimum, a plurality of intermediate and a maximum span distance between the respective connected plates. In use, the maximum span CD carrying plate hinge is disposed proximate the clam-shell member hinge, the plurality of intermediate span plate hinges are disposed progressively next to the maximum span plate hinge and the minimum span plate hinge is disposed in an interior region of the compact disk carrying case such that it is adapted to be closed on itself such that its respective connected plates are proximately facing each other when the CD carrying case is closed.

BRIEF DESCRIPTION OF THE DRAWINGS

Further objects and advantages of the present invention can be found in the detailed description of the preferred embodiments when taken in conjunction with the accompanying drawings in which:

FIG. 2 diagrammatically illustrates a partial view of the CD carrying case with the overlay locking member open;

FIG. 3 diagrammatically illustrates a partial, broken away view of the CD carrying case showing the plate hinges having different span distances;

FIG. 4 diagrammatically illustrates a detailed view of the plate hinges and the clam-shell member hinge with the overlay locking member;

FIG. 5 diagrammatically illustrates a partial view of a plurality of compact disk carrying plates showing the plate hinges having progressively increasing span distances;

FIG. 6 diagrammatically illustrates a cross-sectional view of a portion of the compact disk carrying case wherein the clam-shell members are closed and showing the positioning of the maximum, intermediate and minimum span plate hinges when the outer enclosure, defined by the two clam-shell members, fully encapsulates the CDs.

DETAILED DESCRIPTION OF THE PREFERRED EMBODIMENTS

The present invention relates to a compact disk or CD carrying case with stackable sleeves.

Figure 1:
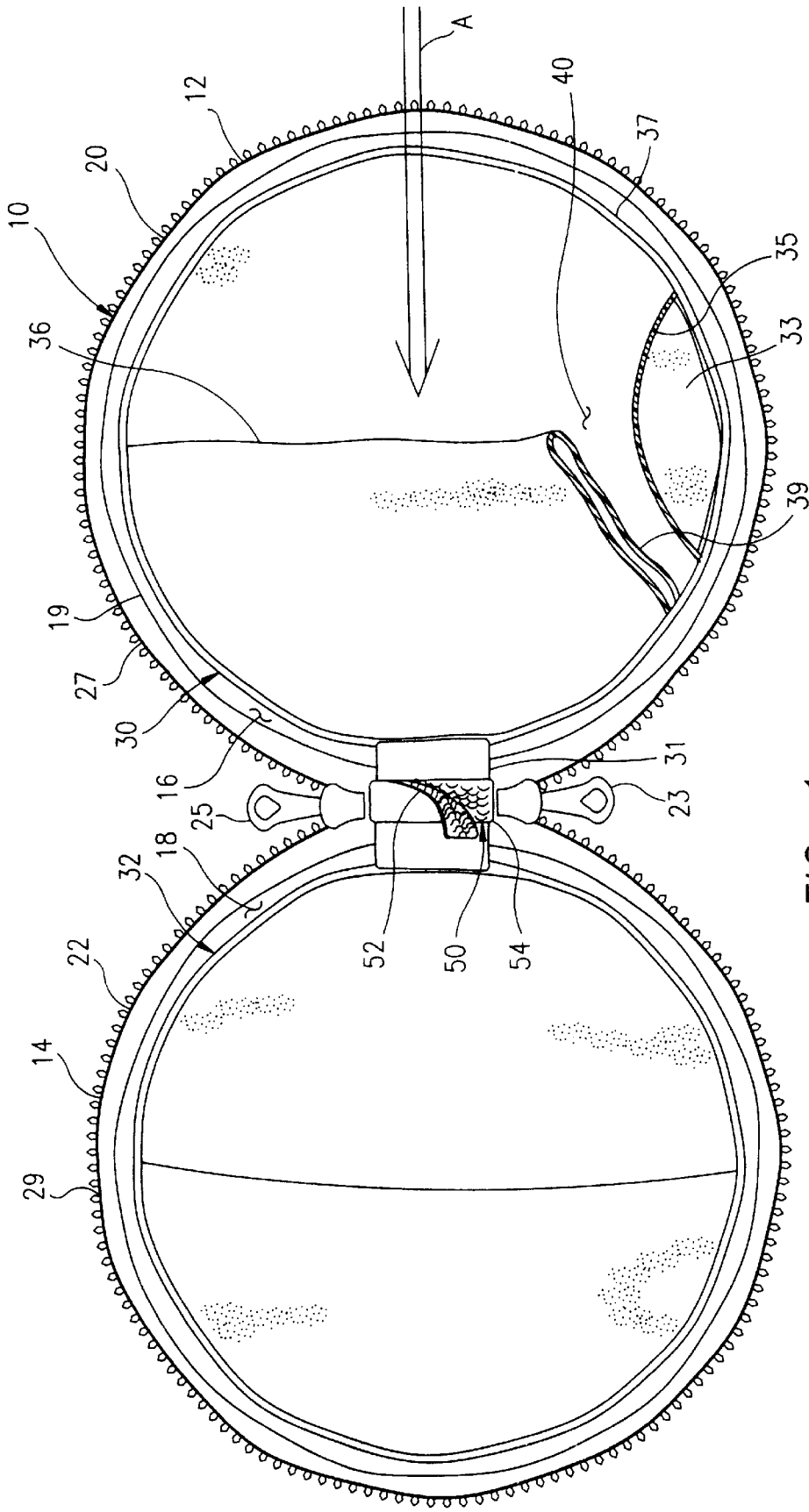
FIG. 1 diagrammatically illustrates the compact disk carrying case in an open position or mode wherein the two clam-shell members fully expose the compact disk carrying plates.
Figure 7:
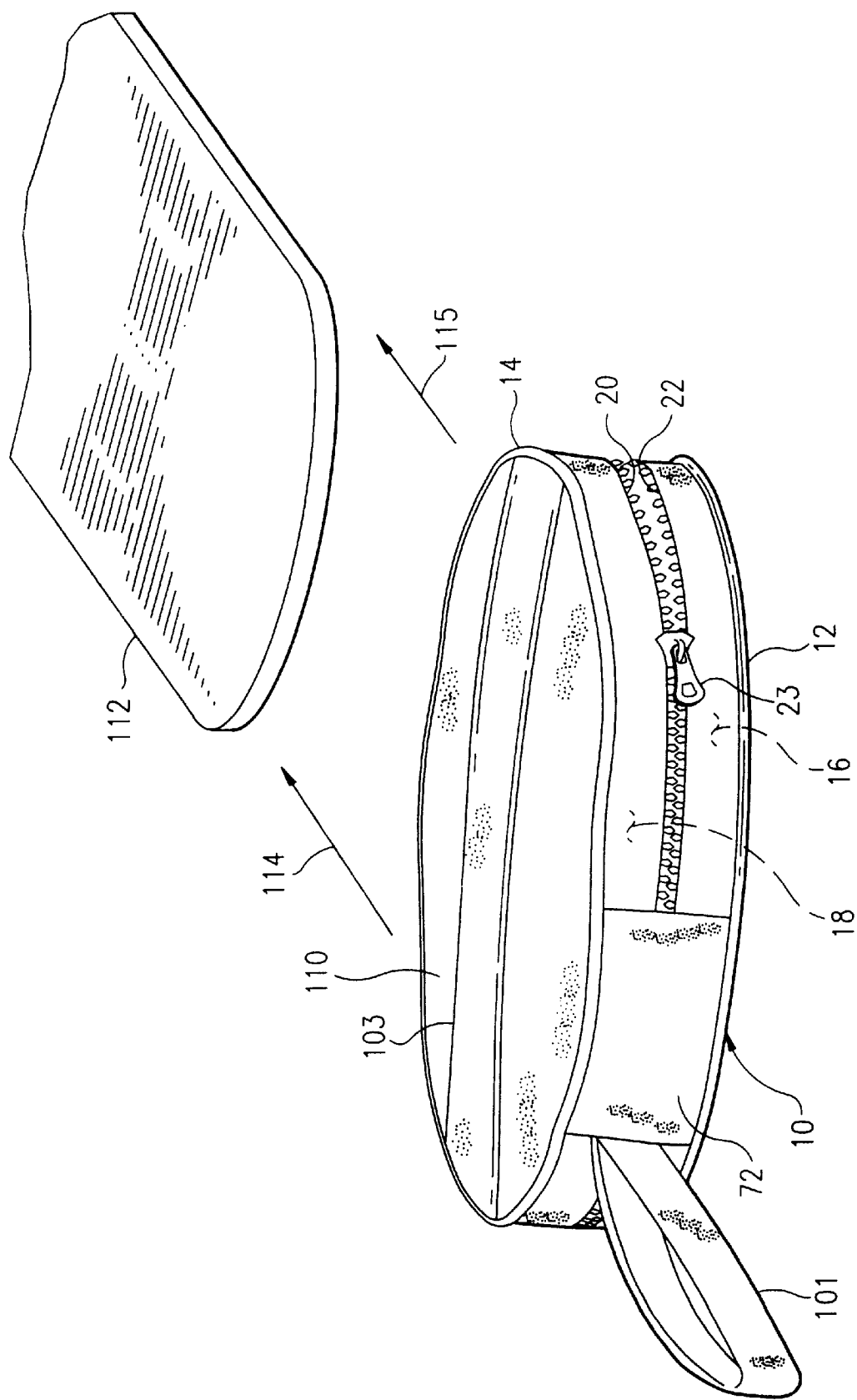
FIG. 7 diagrammatically illustrates the compact disk carrying case when the clam-shell members are partially closed and the interface edges are linked together and further shows the CD carrying case adapted to be inserted on a visor.

FIG. 1 diagrammatically illustrates compact disk carrying case 10 formed by two clam-shell members 12, 14. In FIG. 1, clam-shell members 12, 14 are fully open thereby exposing interior spaces 16, 18 of carrying case 10. In FIG. 7, clam-shell members 12, 14 are fit atop each other so that interfacing edges 20, 22 are adjacent each other. In the closed position or mode, interior spaces 16, 18 defined by clam-shell members 12, 14 combine to form an interior carrying space defined by the outer enclosure. This outer enclosure is defined by the two clam-shell members 12, 14.

Clam-shell members 12, 14 each include an interfacing edge 20,22. These interfacing edges are linked or closed together by an appropriate mechanism. In the illustrated embodiment, the means for closing includes two zippers 23, 25. However, a single zipper may be utilized. In addition, other types of closing mechanism can be utilized as shown in Table 1.

TABLE 1

Zippers
Hook and Loop (VELCRO)
Ties
Snaps
Hook and eye
Buttons

In a working embodiment, the compact disk carrying case is made out of nylon and zipper tracks 27, 29 are sewn into the nylon casing as illustrated herein by seam 19 for clam-shell member 12.

Each clam-shell member holds a plurality of disk carrying plates (discussed later in connection with FIG. 3). FIG. 1 shows disk carrying plate 30 attached via plate hinge 31 to disk carrying plate 32. In a preferred embodiment, disk carrying plate 30 includes a semi-rigid support plate 33, preferably made of cardboard. A soft cloth covering 35 covers cardboard plate 33. Cloth covering 35 is sewn together with the cloth covering on the back side of the plate along seam 37.

In order to carry a compact disk, the CD carrying plate 30 also includes a pouch 36 defined by a generally semi-circular cloth unit formed by overlapping cloth piece 39. Cloth piece 39 forming pouch 36 is sewn to the other components of the carrying plate 30 along seam 37. Disks are inserted into pouch 36 as shown by arrow A and the disks are captured at least partially in space 40. As discussed later in conjunction with FIG. 3, each disk carrying plate includes both a frontside pouch 36 and a backside pouch (see FIG. 3) such that each plate carries two CDs.

The disk carrying plates are grouped together in pairs and each pair is connected by a hinge, one of which is hinge 31 connecting CD carrying plates 30, 32. Although only six disk carrying plates are illustrated herein (FIG. 3), it should be noted that the CD carrying case can contain a large number of CD carrying plates, in excess of six, dependent upon the height 41 (FIG. 3) of each clam-shell member. Herein, the present invention is discussed in conjunction with six disk carrying plates because it is difficult to illustrate a significantly large number of plates. However, the invention is not limited to such a small carrying case.

In order to secure each pair of disk carrying plates 30, 32 within clam-shell members 12, 14, an overlay locking member 50 is utilized to removably attachment the plate hinges to the carrying case. In the working embodiment, overlay locking member 50 is configured by two strips of attachable cloth carrying hook and loop attachment mechanisms. Accordingly, strip 52 carries, for example, a plurality of hooks and strip 54 carries, for example, a plurality of loops. The hook and loop attachment mechanism is sometimes sold under the trademark VELCRO. Other overlay locking members may be utilized. Table 2 that follows describes some of these locking members.

TABLE 2

Hook and Loop bearing cloth strips (VELCRO)
Ties
Snap
Hook and eye
Button

FIG. 2 diagrammatically illustrates overlay locking member 50 being open such that locking member 52 is disposed apart from locking member 54. In this manner, plate hinge 31 and the attached respective CD carrying plates can be withdrawn from the outer enclosure defined by clam-shell numbers 12, 14. Since the disk carrying plates can be removed from the enclosure, this enables the user to remove one or more pairs of CD carrying plates and hence the CDs, without removing the entire carrying case. This feature facilitates loading and further distribution of the CD carrying case and CD carrying plate units.

FIG. 3 diagrammatically illustrates a cross-sectional view of six CD carrying plates stored in clam-shell members 12, 14. CD carrying plates 30, 51, 53 are disposed in clam-shell member 12 and CD carrying plates 32, 54 and 56 are disposed in clam-shell member 14. Carrying plates 30, 32 are joined together via plate hinge 31, plates 51, 54 are joined together via hinge 61 and plates 53, 56 are joined together via hinge 63. As shown in the partial, broken away view on the right hand side of FIG. 3, CD carrying plates 30, 51 and 53 each include frontside pouches 36 and 62 and backside pouches, two of which are identified as backside pouches 64 and 66. Accordingly, each CD carrying plate 36, 51, 53, 32, 54 and 56, can carry two CDs, one CD in the front pouch and the second CD in the back pouch. Accordingly, although six CD carrying plates are shown in FIG. 3, the carrying case can accommodate up to twelve CDs. As stated earlier, the CD carrying case can accommodate many more than six CD carrying plates dependent upon height 41 of each clam-shell member 12, 14.

Clam-shell member 12 includes side wall 70. Side wall 70 of clam-shell member 12 is attached at a hinge region 72 to side wall member 74 of clam-shell member 14. Stated another way, the local region of interfacing edge 20 of clam-shell member 14 is attached via a clam-shell hinge 72 to interface edge 22 of clam-shell member 14.

CD carrying plate hinges 31, 61 and 63 have progressively increasing span distances between the respective connected plates 30, 32 and 51, 54 and 53, 56.

FIG. 4 is a detailed view of clam-shell hinge 72 and plate hinges 31, 61 and 63. In addition, overlay locking member 50 is shown in an open mode.

FIG. 5 diagrammatically shows the progressively decreasing span distance maintained by plate hinges 63, 61 and 31 for the respective connected plates 53, 56 and 51, 54 and 30, 32. These progressively decreasing span distances provided by plate hinges 63,61 and 31, enable the clam-shell members to be closed onto each other and provide for true vertical stacking of the CD carrying plates.

FIG. 6 diagrammatically shows the vertical stacking of the CD carrying plates wherein plate 56 is stacked atop plate 54, plate 32, plate 30, plate 51 and plate 53. The largest or maximum plate hinge 63 links upper and lower CD carrying plates 56, 53. The intermediate hinge 61 provides vertical stackable placement of CD carrying plates 54, 51. Minimum span plate hinge 31 enables that hinge to be closed onto itself such that the respective connected CD carrying plates 30, 32 are proximately facing each other. Overlay locking member 50 captures all of the plate hinges such that the CD carrying plates do not fall out of the enclosure when the clam-shell members 14, 12 are opened. In this illustration, clam-shell hinge 72 is fully open or in a planar position. In FIG. 3, clam-shell hinge 72 is in a closed position when clam-shell member 12 is disposed in the same horizontal plane as clam-shell member 14. The locking member 50 provides a loose, permanently secured loop extending over said hinges and locks each of said pair of plates within said outer enclosure. The loop lock permits each pair of plates to move, to some degree, within the enclosure. Alternatively, the hinges 31, 61 and 63 could be permanently attached together. The largest width hinge 63 provides a wrap around binder for the other, less wide hinges. See FIG. 6.

By providing a plurality of plate hinges having different spans, the CD carrying plates can be vertically stacked atop each other. If the plate hinges have the same span, the CD carrying plates would not be stacked vertically atop each other but would be staggered because of the geometric distance between interface edge 12 and the top CD carrying plate 30 as compared with the distance between interface edge 12 and the bottom CD carrying plate 53.

FIG. 7 diagrammatically illustrates carrying case 10 wherein zipper 23 has partially closed interfacing edges 20, 22. In FIG. 7 clam-shell hinge 72 is fully open. In order to enable the user to easily carry the CD carrying case, a loop strap 101 is provided near one side of clam-shell hinge 72. Since the CD carrying case is designed for transportation of CDs in an automobile, the case also includes a strap 103, made of elastic material, that spans the diameter of carrying case 10. In one embodiment CD carrying plates are circular and the clam-shell members are circular. Strap 103 can be lifted from exposed surface 110 of clam-shell member 14 such that case 10 can be slid onto or mounted onto visor 112. Case 10 is mounted on visor 112 by moving the case in the direction shown by arrows 114 and 115 and interposing visor 112 between strap 103 and exposed surface 110 of clam-shell member 14.

The claims appended hereto are meant to cover modifications and changes within the scope and spirit of the present invention.

What is claimed is:

1. A carrying case for compact disks comprising:

an outer enclosure defined by two clam-shell members, each clam-shell member having an interfacing edge which mates with a corresponding interfacing edge on the other clam-shell member and means for closing said interfacing edges together when said clam-shell members are closed to form said outer enclosure, said clam-shell members hinged together along a portion of said respective interfacing edges;

a plurality of compact disk carrying plates grouped into n pairs of plates by n hinges;

each of n hinges which connect a respective pair of said plates together having a progressively increasing longer span which establishes an increasingly longer span distance between said respective connected plates and defining minimum, intermediate and maximum span hinge lengths between said respective connected plates; and, a maximum length span plate hinge disposed proximate the clam-shell member hinge, a minimum length span plate hinge adapted to be closed on itself such that its respective connected plates are proximally facing and a plurality of intermediate span length plate hinges disposed intermediate said maximum and minimum span length plate hinges when said disk carrying plates are disposed in said outer enclosure.

2. A carrying case as claimed in claim 1 wherein each said disk carrying plate includes a front side and a back side pouch which is adapted to capture a compact disk therein.

3. A carrying case as claimed in claim 2 wherein a base section of said front side and said backside pouch is disposed near the respective plate hinge.

4. A carrying case as claimed in claim 1 including an overlay locking member disposed at said clam-shell hinge and adapted to be overlaid atop said n hinges when said plates are disposed in said clam-shell members.

5. A carrying case as claimed in claim 1 wherein said means for closing is a zipper.

6. A carrying case as claimed in claim 1 including a strap on an outer surface of one of said clam-shell members, said strap adapted to encircle a visor.

7. A carrying case as claimed in claim 1 wherein each of said clam-shell members is substantially circular in shape and said plates are substantially circular in shape.

8. A carrying case as claimed in claim 3 including an overlay locking member disposed at said clam-shell hinge and adapted to be overlaid atop said n hinges when said plates are disposed in said clam-shell members.

9. A carrying case as claimed in claim 8 wherein said means for closing is a zipper.

10. A carrying case as claimed in claim 9 including a strap on an outer surface of one of said clam-shell members, said strap adapted to encircle a visor.

11. A carrying case as claimed in claim 10 wherein each of said clam-shell members is substantially circular in shape and said plates are substantially circular in shape.

12. A carrying case for compact disks comprising:

an outer enclosure defined by two clam-shell members, each clam-shell member having an interfacing edge which mates with a corresponding interfacing edge on the other clam-shell member and means for closing said interfacing edges together when said clam-shell members are closed to form said outer enclosure, said clam-shell members hinged together along a portion of said respective interfacing edges;

a plurality of compact disk carrying plates grouped into n pairs of plates by n hinges;

each of n hinges which connect a respective pair of said plates together having a progressively increasing longer span which establishes an increasingly longer span distance between said respective connected plates and defining minimum, intermediate and maximum span hinge lengths between said respective connected plates;

a loose, permanently secured loop extending over said n hinges and locking each said pair of plates within said outer enclosure; and a maximum length span plate hinge disposed proximate the clam-shell member hinge, a minimum length span plate hinge adapted to be closed on itself such that its respective connected plates are proximally facing and a plurality of intermediate span length plate hinges disposed intermediate said maximum and minimum span length plate hinges when said disk carrying plates are disposed in said outer enclosure.

13. A carrying case as claimed in claim 12 wherein each said disk carrying plate includes a front side and a back side pouch which is adapted to capture a compact disk therein.

14. A carrying case as claimed in claim 13 wherein a base section of said front side and said backside pouch is disposed near the respective plate hinge.

15. A carrying case as claimed in claim 12 including an overlay locking member disposed at said clam-shell hinge and adapted to be overlaid atop said n hinges when said plates are disposed in said clam-shell members.

16. A carrying case as claimed in claim 12 wherein said means for closing is a zipper.

17. A carrying case for compact disks comprising:

an outer enclosure defined by two clam-shell members, each clam-shell member having an interfacing edge which mates with a corresponding interfacing edge on the other clam-shell member and means for closing said interfacing edges together when said clam-shell members are closed to form said outer enclosure, said clam-shell members hinged together along a portion of said respective interfacing edges;

a plurality of compact disk carrying plates grouped into n pairs of plates by n hinges;

each of n hinges which connect a respective pair of said plates together having a progressively increasing longer span which establishes an increasingly longer span distance between said respective connected plates and defining minimum, intermediate and maximum span hinge lengths between said respective connected plates, said n hinges being permanently secured together; and a maximum length span plate hinge disposed proximate the clam-shell member hinge, a minimum length span plate hinge adapted to be closed on itself such that its respective connected plates are proximally facing and a plurality of intermediate span length plate hinges disposed intermediate said maximum and minimum span length plate hinges when said disk carrying plates are disposed in said outer enclosure.

18. A carrying case as claimed in claim 17 wherein each said disk carrying plate includes a front side and a back side pouch which is adapted to capture a compact disk therein.

19. A carrying case as claimed in claim 18 wherein a base section of said front side and said backside pouch is disposed near the respective plate hinge.

20. A carrying case as claimed in claim 19 wherein said means for closing is a zipper.

21. A carrying case for compact disks comprising:

an outer enclosure defined by two clam-shell members, each clam-shell member having an interfacing edge which mates with a corresponding interfacing edge on the other clam-shell member and means for closing said interfacing edges together when said clam-shell members are closed to form said outer enclosure, said clam-shell members hinged together along a portion of said respective interfacing edges;

three pairs of compact disk carrying plates, respective pairs of said plates connected together by respective first, second and third hinges;

each of said first, second and third hinges which connect a respective pair of said plates together having progressively increasing longer spans which establish increasingly longer span distances between said respective connected plates, said hinges defining minimum, intermediate and maximum span distances between said respective connected plates; and, a maximum length span plate hinge disposed proximate the clam-shell member hinge, a minimum length span plate hinge adapted to be closed on itself such that its respective connected plates are proximally facing, and an intermediate length span plate hinge disposed intermediate said maximum and minimum span length plate hinges when said disk carrying plates are disposed in said outer enclosure.

22. A carrying case as claimed in claim 21 wherein each said disk carrying plate includes a front side and a back side pouch which is adapted to capture a compact disk therein.

23. A carrying case as claimed in claim 22 wherein a base section of said front side and said backside pouch is disposed near the respective plate hinge.

24. A carrying case as claimed in claim 21 including an overlay locking member disposed at said clam-shell hinge and adapted to be overlaid atop said first, second and third hinges when said plates are disposed in said clam-shell members.

25. A carrying case as claimed in claim 21 wherein said means for closing is a zipper.

26. A carrying case as claimed in claim 21 including a strap on an outer surface of one of said clam-shell members, said strap adapted to encircle a visor.

27. A carrying case as claimed in claim 21 wherein each of said clam-shell members is substantially circular in shape and said plates are substantially circular in shape.

28. A carrying case as claimed in claim 23 including an overlay locking member disposed at said clam-shell hinge and adapted to be overlaid atop said first, second and third hinges when said plates are disposed in said clam-shell members.

29. A carrying case as claimed in claim 28 wherein said means for closing is a zipper.

30. A carrying case as claimed in claim 29 including a strap on an outer surface of one of said clam-shell members, said strap adapted to encircle a visor.

31. A carrying case as claimed in claim 30 wherein each of said clam-shell members is substantially circular in shape and said plates are substantially circular in shape.

32. A carrying case for compact disks comprising:

an outer enclosure defined by a plurality of clam-shell members, each clam-shell member having an interfacing edge which mates with a corresponding interfacing edge on the other clam-shell member and means for closing said interfacing edges together when said clam-shell members are closed to form said outer enclosure, said clam-shell members hinged together along a portion of said respective interfacing edges;

a plurality of compact disk carrying plates connected together in groups with respective plates of each group connected together by respective hinges;

each of the said hinges which connect plates of a group together having progressively increasing longer spans which establish increasingly longer span distances between said respective connected plates, said hinges defining minimum, intermediate and maximum span hinge lengths between said respective connected plates; and, a maximum length span plate hinge disposed proximate the clam-shell member hinge, a minimum length span plate hinge adapted to be closed on itself such that its respective connected plates are proximally facing, and at least one intermediate length span plate hinge disposed intermediate said maximum and minimum span length plate hinges when said disk carrying plates are disposed in said outer enclosure.

* * * * *